United States Patent
Ein (10) Patent No.: US 9,016,755 B2
(45) Date of Patent: Apr. 28, 2015

(54) ADJUSTABLE AND FLEXIBLE RECREATIONAL OR LARGE VEHICLE WINDSHIELD COVER

(71) Applicant: Morgan Ein, Valencia, CA (US)

(72) Inventor: Morgan Ein, Valencia, CA (US)

(73) Assignee: Adco Products, Inc., Valencia, CA (US)

(*) Notice: Subject to any disclaimer, the term of this patent is extended or adjusted under 35 U.S.C. 154(b) by 0 days.

(21) Appl. No.: 13/938,307

(22) Filed: Jul. 10, 2013

(65) Prior Publication Data

US 2015/0013861 A1    Jan. 15, 2015

(51) Int. Cl.
*B60J 11/08* (2006.01)

(52) U.S. Cl.
CPC ...................... *B60J 11/08* (2013.01)

(58) Field of Classification Search
CPC .......................................................... B60J 11/08
USPC ................ 296/95.1, 138–145, 97.1–97.9
See application file for complete search history.

(56) References Cited

U.S. PATENT DOCUMENTS

| | | | | |
|---|---|---|---|---|
| 2,065,242 | A * | 12/1936 | Omerly, Jr. | 160/370.21 |
| 2,489,901 | A * | 11/1949 | Kocinski | 160/181 |
| 4,597,608 | A * | 7/1986 | Duffy | 296/95.1 |
| 4,759,581 | A * | 7/1988 | McNamee | 296/97.7 |
| 4,779,918 | A * | 10/1988 | McNamee | 296/95.1 |
| 4,810,015 | A * | 3/1989 | McNeil | 293/128 |
| 4,966,405 | A * | 10/1990 | Tremaine et al. | 296/95.1 |
| 5,035,460 | A * | 7/1991 | Huang | 296/95.1 |
| 5,121,957 | A * | 6/1992 | O'Shea | 296/1.04 |
| 5,291,698 | A * | 3/1994 | Rayner, Jr. | 52/3 |
| 5,292,167 | A * | 3/1994 | Hellman | 296/95.1 |
| 5,409,286 | A * | 4/1995 | Huang | 296/136.04 |
| 5,615,923 | A * | 4/1997 | Madison | 296/95.1 |
| 5,816,641 | A * | 10/1998 | Chen | 296/95.1 |
| 6,015,180 | A * | 1/2000 | Beuerle | 296/95.1 |
| 8,087,712 | B2 * | 1/2012 | Svengalis | 296/96.15 |
| 8,251,433 | B2 * | 8/2012 | Boer | 296/97.7 |
| 8,342,226 | B2 * | 1/2013 | Zheng | 160/370.21 |
| 8,387,676 | B2 * | 3/2013 | Hunckler et al. | 160/370.21 |

* cited by examiner

*Primary Examiner* — H Gutman
(74) *Attorney, Agent, or Firm* — Buchalter Nemer, PC (57) ABSTRACT

A recreational or large vehicle windshield cover is disclosed and comprises: a) a windshield cover component having a bottom portion, a top portion, a left side and a right side, b) at least two strap components coupled to the bottom portion of the windshield cover component, and c) at least one strap component coupled to the top portion of the windshield cover component. Methods are also contemplated of using a recreational or large vehicle windshield cover, comprising: providing a windshield cover component having a bottom portion, a top portion, a left side and a right side, at least two strap components coupled to the bottom portion of the windshield cover component, and at least one strap component coupled to the top portion of the windshield cover component; providing a recreational or large vehicle; securing the top strap component to the top of the recreational or large vehicle; and securing the at least two strap components coupled to the bottom portion of the windshield cover component to the side of the recreational or large vehicle.

14 Claims, 10 Drawing Sheets

ADJUSTABLE AND FLEXIBLE RECREATIONAL OR LARGE VEHICLE WINDSHIELD COVER

FIELD OF THE SUBJECT MATTER

The field of the subject matter is adjustable and flexible recreational or large vehicle windshield covers, specifically including windshield covers for Class "A" style and "Bus" style recreational vehicles.

BACKGROUND

Recreational vehicles have become more popular as families and retirees look to travel closer to home by road, travel with more of the comforts of home, including pets, or a combination of both. Recreational vehicles can span the size of being the size of a van all the way up to the size of a large bus. Travelers also have the option of buying a recreational vehicle or renting one, depending on the travel needs at the time. While many variations of recreational vehicles are manufactured, Class "A" and "Bus" style recreational vehicles are defined as those that are manufactured on a large truck chassis distinguished by the fact that the driving area can be accessed from the living space or vehicle interior while standing.

There are times of the day (or night) where the travelers need to cover the windshield. In some instances, travelers may want to cover the windshield at a stop or campground in order to keep sunshine out and the interior of the vehicle cool. At other times of the day, travelers cover the windshield to keep outsiders from being able to look inside of the interior of the vehicle, such as at night. Finally, travelers who own their recreational vehicles need to protect the windshield when the vehicle isn't in use or is in storage.

Suitable covers should also be adjustable and flexible, while being easily stored and cleaned. The adjustable feature is critical, in that travelers may need to use the windshield cover on a number of different types and sizes of recreational vehicles. The flexibility feature is also critical, in that a hard or stiff windshield cover is likely going to leave gaps between the cover and the windshield or may crack or break after some use. The flexibility feature is also critical for storage. In a recreational vehicle, there is very little room to store anything, and therefore, any suitable windshield cover must be able to roll or fold up in order to be easily stored in a small space, such as under a seat, in a glove compartment or another small space.

At this point, there are still very few options available for recreational vehicle travelers. There are internal shades that pull down when the traveler wants to shield the inner compartment from the outside. However, these shades rarely cover the full inside of the windshield, they do not protect the windshield itself and they are not able to be used on other recreational vehicles, since they are cut to the size of the inner compartment and usually mounted above the front seats. There are also custom windshield covers that are made to the exact size of any given windshield and mounted in place using snaps or twist grommets. After several years of outdoor exposure these types of covers tend to degrade from ultra violet light causing the vehicle owner to replace the cover with an exact matching snap or twist grommet pattern, which can be difficult to accomplish.

To this end, it would be desirable to develop, produce and utilize an adjustable and flexible recreational or large vehicle windshield cover, specifically for Class "A" and "Bus" style Recreational Vehicles that: a) can be used on a number of different types and sizes of Class "A" and "Bus" style recreational vehicles, b) will not leave gaps between the cover and the windshield, c) can be easily cleaned, d) does not require drilling of snaps or twist grommets into the body of the vehicle, and e) can roll up or fold up in order to be easily stored in a small space, such as under a seat, in a glove compartment or another small space.

SUMMARY OF THE SUBJECT MATTER

A recreational or large vehicle windshield cover is disclosed and comprises: a) a windshield cover component having a bottom portion, a top portion, a left side and a right side, b) at least two strap components coupled to the bottom portion of the windshield cover component, and c) at least one strap component coupled to the top portion of the windshield cover component.

Methods are also contemplated of using a recreational or large vehicle windshield cover, comprising: providing a windshield cover component having a bottom portion, a top portion, a left side and a right side, at least two strap components coupled to the bottom portion of the windshield cover component, and at least one strap component coupled to the top portion of the windshield cover component; providing a recreational or large vehicle; securing the top strap component to the top of the recreational or large vehicle; and securing the at least two strap components coupled to the bottom portion of the windshield cover component to the side mirrors of the recreational or large vehicle.

DETAILED DESCRIPTION

An adjustable and flexible recreational or large vehicle windshield cover has been developed and is described herein that: a) is easily cleaned, b) can be used on a number of different types and sizes of Class "A" and "Bus" style recreational vehicles, c) will not leave gaps between the cover and the windshield, and d) can roll up or fold up in order to be easily stored in a small space, such as under a seat, in a glove compartment or another small space.

Figure 1:
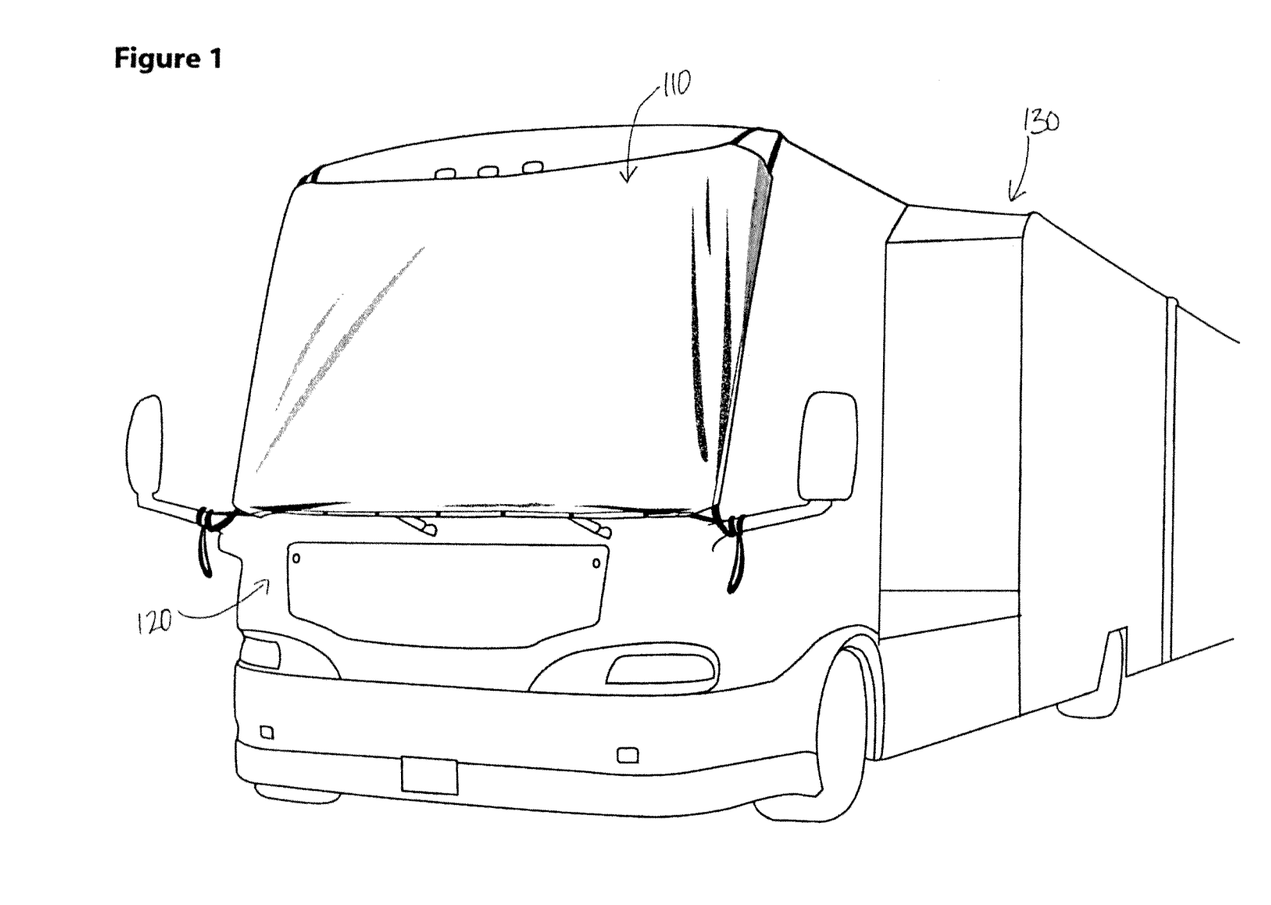
FIG. 1 shows a contemplated windshield cover operatively coupled with a recreational vehicle.

FIG. 1 shows a contemplated Class "A" or "Bus" style recreational vehicle windshield cover 110 operationally engaged with the front portion 120 of a recreational vehicle 130. The entire vehicle isn't shown, but it is understood to be implied as there by the Figure.

Figure 2:
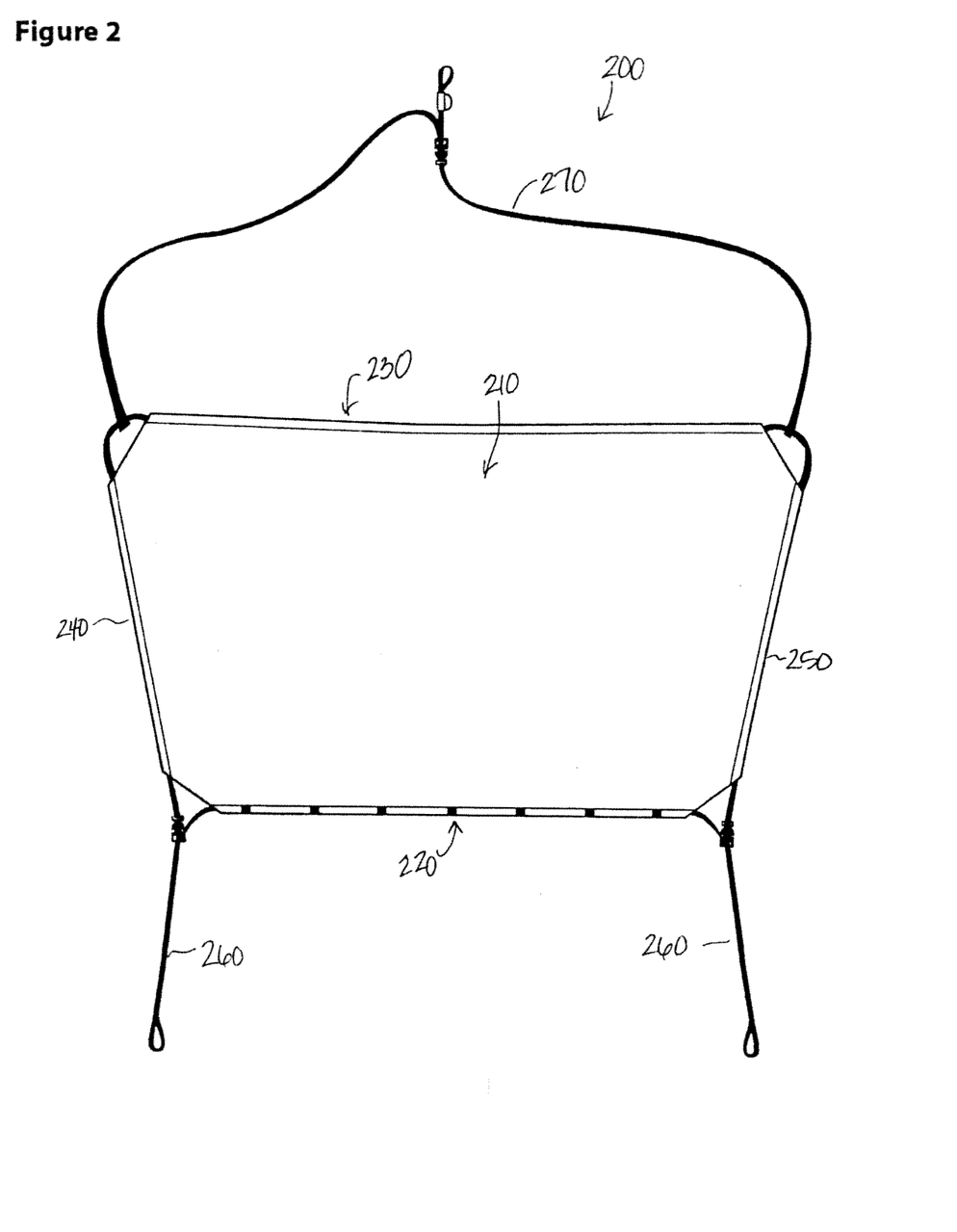
FIG. 2 shows a contemplated windshield cover.

Specifically, a recreational or large vehicle windshield cover 200 is shown in FIG. 2 and comprises: a) a windshield cover component 210 having a bottom portion 220, a top portion 230, a left side 240 and a right side 250, b) at least two strap components 260 coupled to the bottom portion 220 of the windshield cover component 200, and c) at least one strap component 270 coupled to the top portion 230 of the windshield cover component 200.

Figure 3:
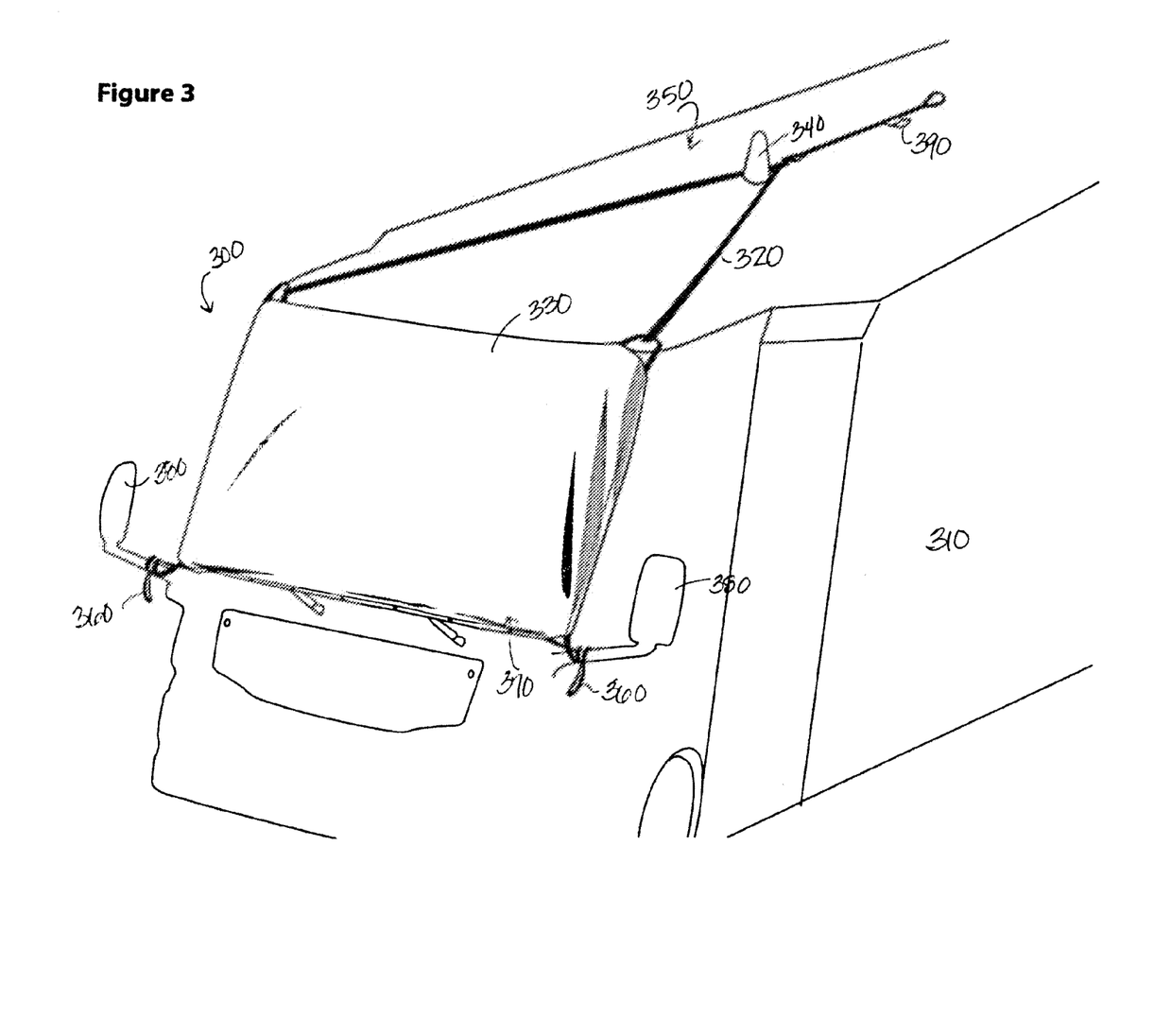
FIG. 3 shows a contemplated windshield cover operatively coupled with a recreational vehicle.

FIG. 3 shows a contemplated recreational or large vehicle windshield cover 300 operationally engaged with a recreational vehicle 310, where the at least one strap component 320 coupled to the top portion of the windshield cover component 330 is operatively engaged with an extruded feature 340 on the roof 350 of the vehicle 310, such as an antenna, air conditioner, roof top equipment cap or other similar features. In this embodiment, the at least two strap components 360 coupled to the bottom portion 370 of the windshield cover component 330 are operatively coupled with the side view mirrors 380 on the vehicle 310.

In contemplated embodiments, one or more of the straps disclosed herein may comprise a natural material, a synthetic material or a combination thereof. Contemplated natural materials comprise any suitable material for this application and may include cotton, hemp, wool, leather, suede or a combination thereof. Contemplated synthetic materials comprise any suitable material for this application, including nylon, spandex, lycra or a combination thereof. Suitable structure for the one or more straps includes a webbing design, a woven design, a solid design or a combination thereof. The key objectives of the straps are at least one of the following: a) flexible, b) durable, c) easy to store and d) non-abrasive—in that the straps should not damage the paint or finish significantly.

Figure 4:
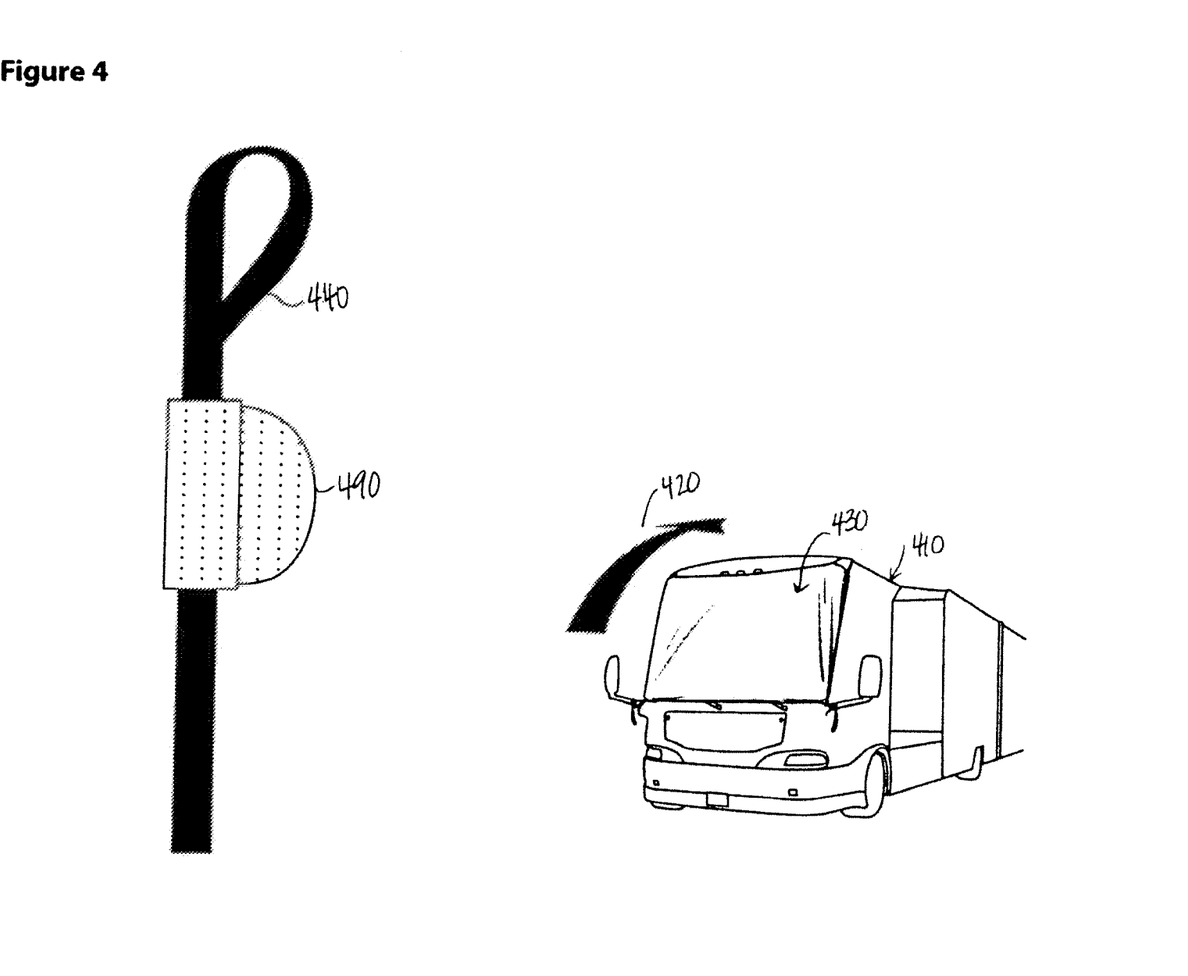
FIG. 4 shows a contemplated weighting component and a portion of the strap coupled to the top portion of the windshield cover component.

Also shown in FIG. 3 is a weighting piece 390 that is coupled with the at least one strap component 320 coupled to the top portion of the windshield cover component 330 (and 430 in FIG. 4) that allows the strap component to be tossed up on the roof (shown as reference number 420 of FIG. 4) of the vehicle 410 and keeps the strap in place until it can be operatively engaged and secured. This weighting piece is shown in more detail in FIG. 4. The weighting piece 490 is coupled with the strap component 440.

Figure 5:
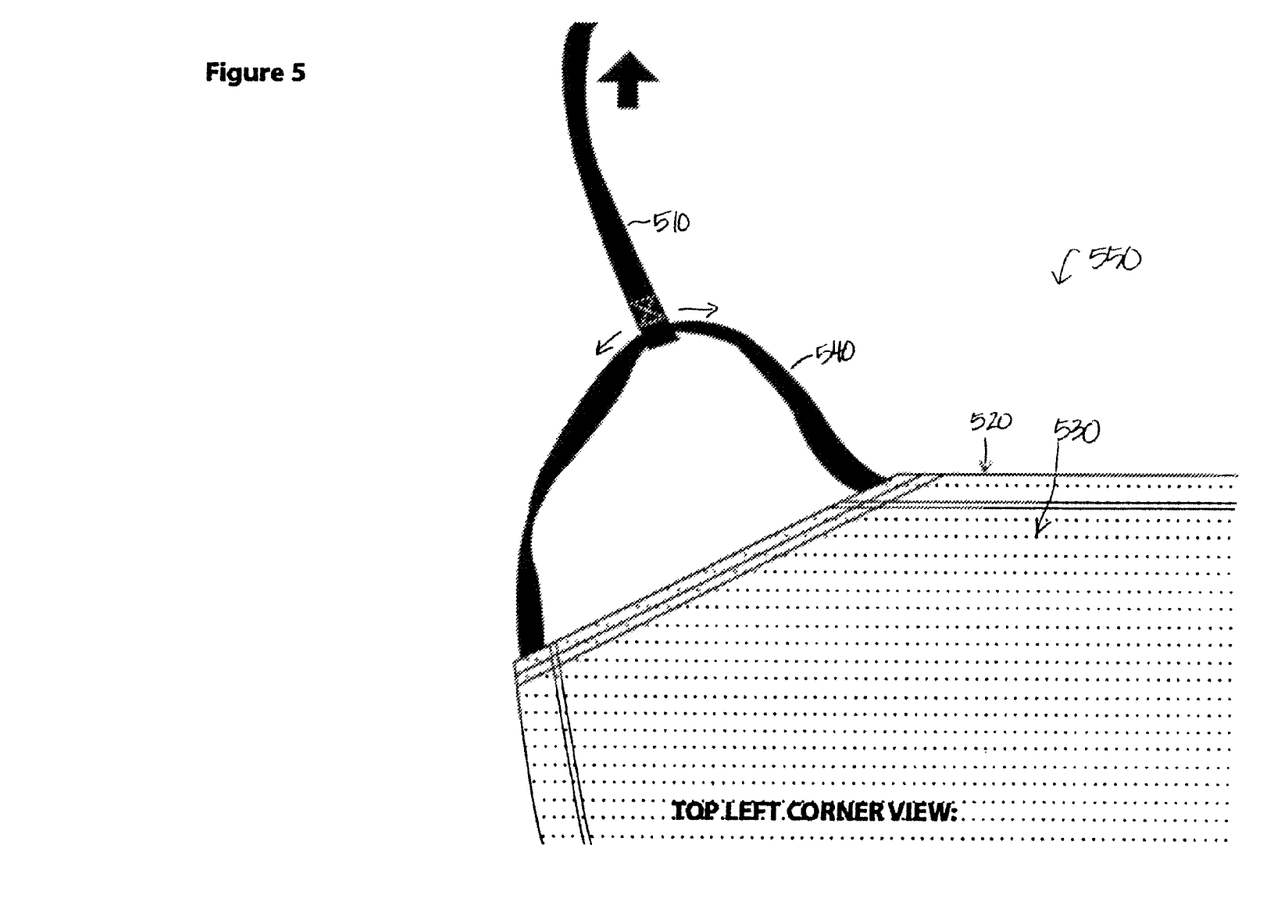
FIG. 5 shows a contemplated loop component and a portion of the strap coupled to the top portion of the windshield cover component.
Figure 6:
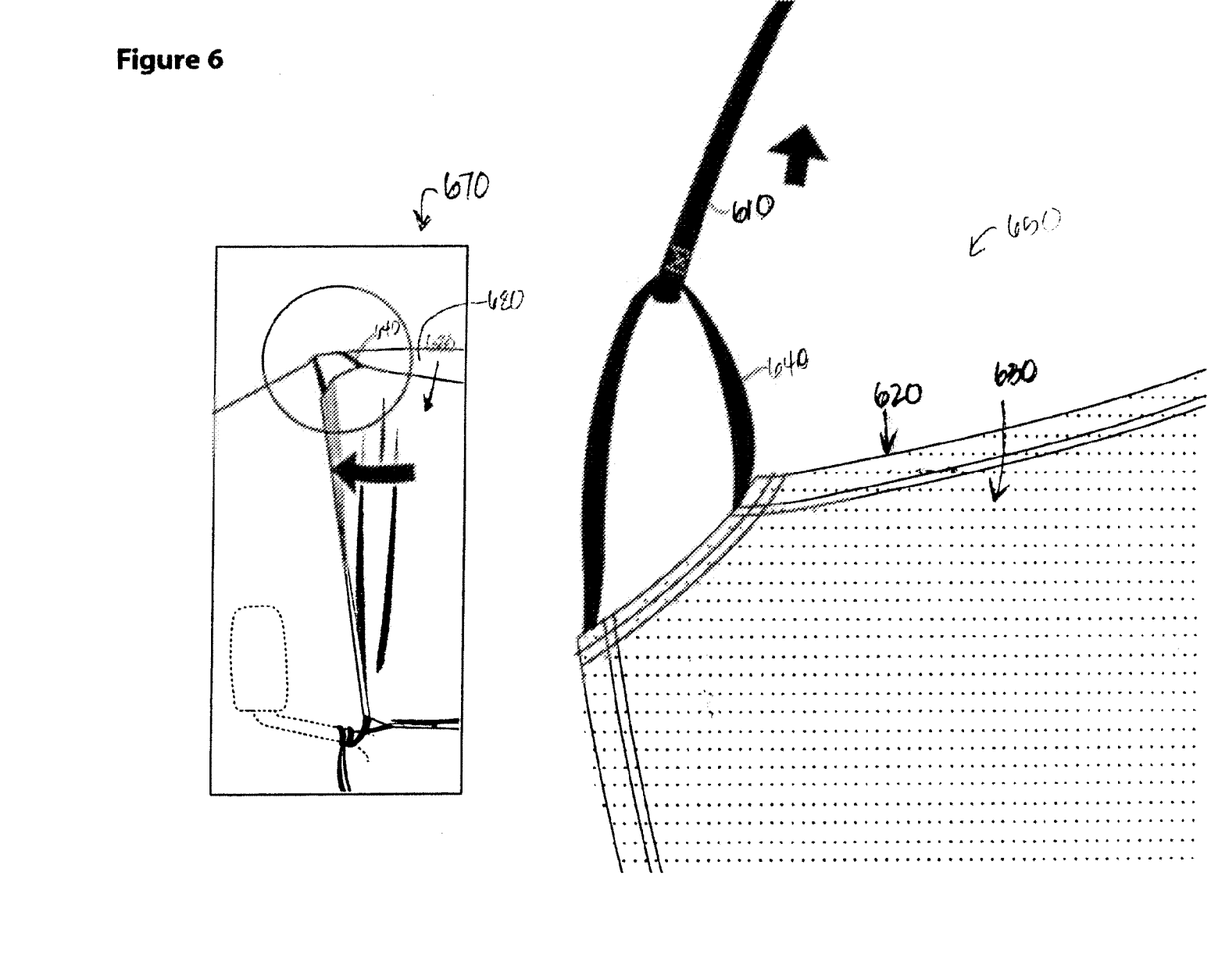
FIG. 6 shows a contemplated loop component and a portion of the strap coupled to the top portion of the windshield cover component.

As shown in FIG. 5 and FIG. 6, in contemplated embodiments, the at least one strap component 510 and 610 coupled to the top portion 520 and 620 of the windshield cover component 530 and 630 is coupled to the top portion 520 and 620 by a loop component 540 and 640, wherein the at least one strap component 510 and 610 can move around on the loop component, thereby adding increased adjustability to the windshield cover 550 and 650. FIG. 6 shows the strap component 610 and the loop component 640 being pulled upward 670 and towards the direction of the roof 680 of the vehicle (not fully shown), as the strap component 610 is operatively engaged with the vehicle.

Figure 7:
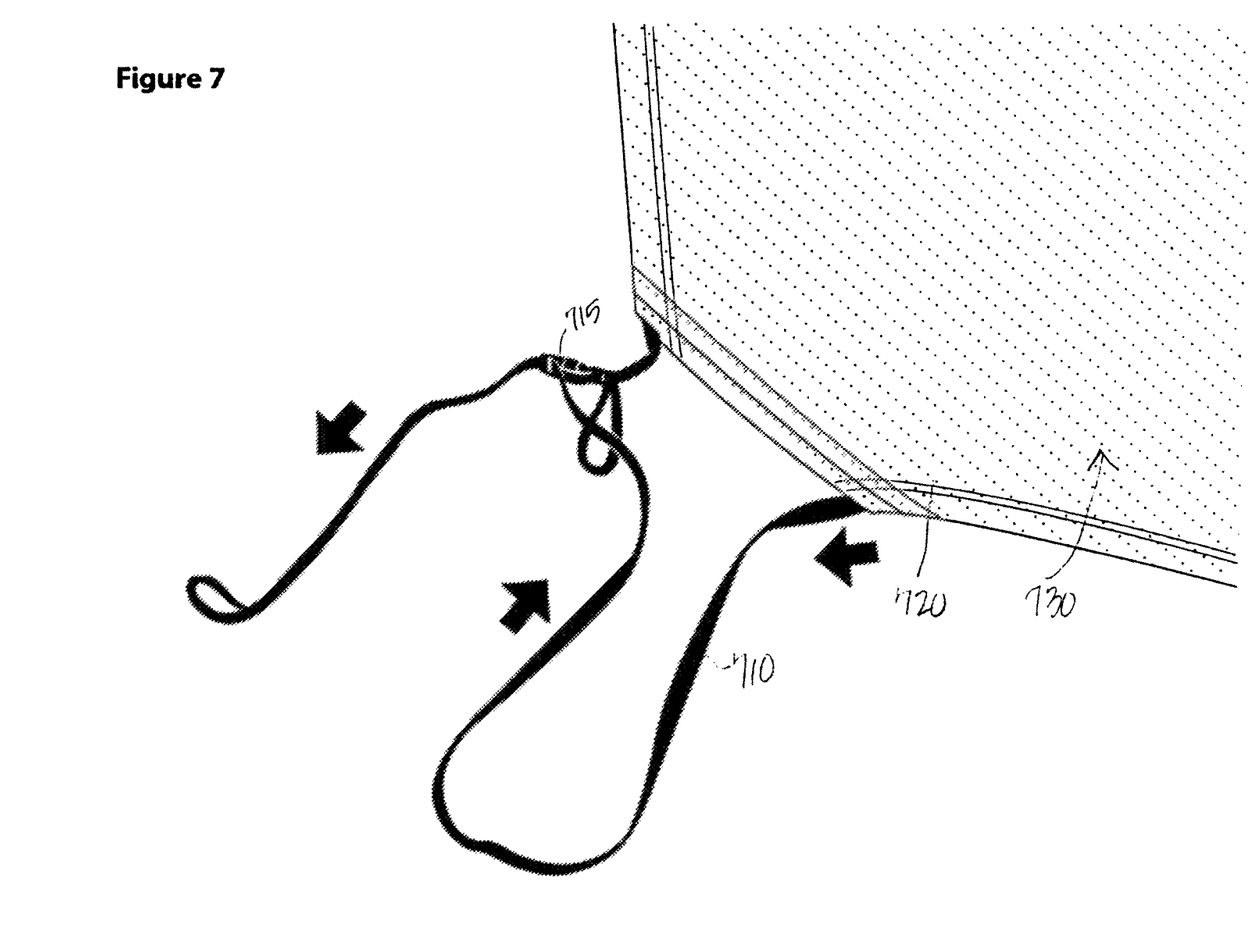
FIG. 7 shows a contemplated strap coupled to the bottom portion of the windshield cover component.
Figure 8:
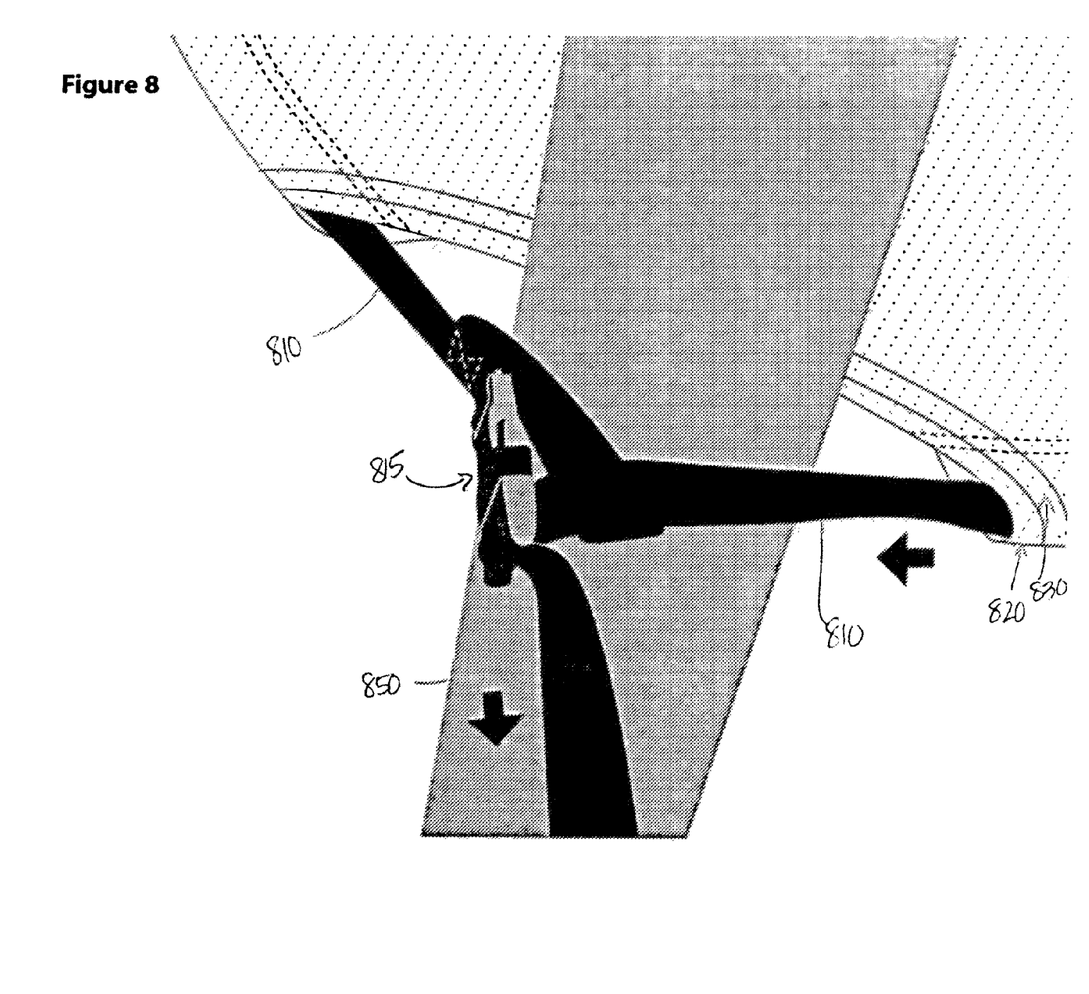
FIG. 8 shows a contemplated strap coupled to the bottom portion of the windshield cover component, wherein the strap is operatively engaged with a mirror arm on the recreational vehicle.

FIG. 7 and FIG. 8 show the strap component 710 and 810 that is coupled to the bottom portion 720 and 820 of the windshield cover component 730 and 830. In FIG. 7, the strap component 710 is shown with a tightening mechanism 715 that allows the strap component 710 to be tightened around a side protrusion on the vehicle 850 (shown in FIG. 8), such as the side view mirror. In FIG. 8, the engaged tightening mechanism 815 is shown operatively working to tighten the strap component 810 around the mirror arm 850.

Figure 9:
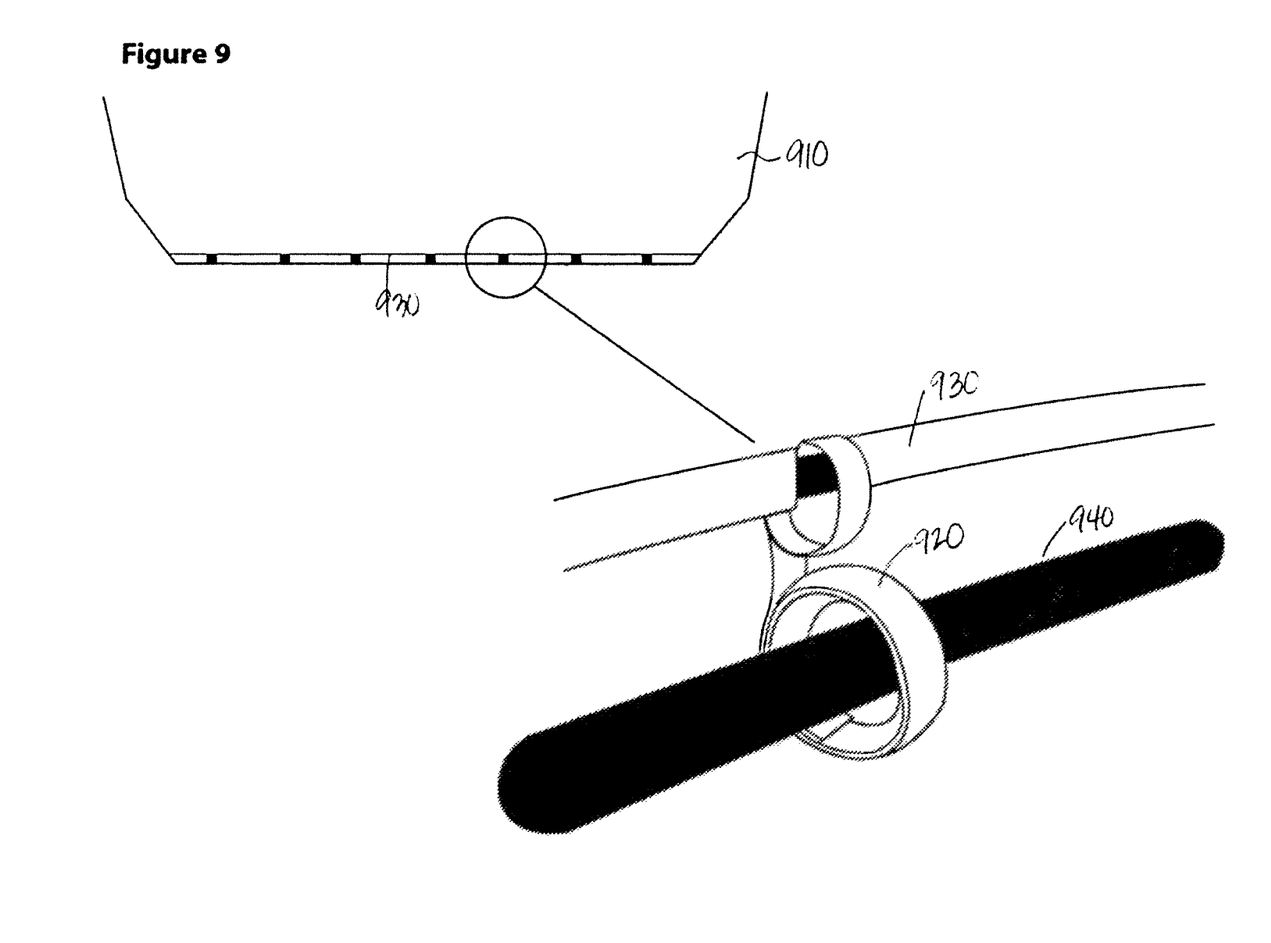
FIG. 9 shows a contemplated bottom coupling component, and in this case, it is represented by a strap that is coupled to the windshield wiper bolt.

In some embodiments, and as shown in FIG. 9, a contemplated Class "A" or "Bus" style recreational vehicle windshield cover 910 further comprises at least one coupling component 920 on the bottom portion 930 of the windshield cover 910, wherein the at least one coupling component 920 is designed to couple with the windshield wipers 940 or another feature on the recreational or large vehicle in order to further secure the cover. In some embodiments, the at least one coupling component comprises VELCRO®, elastic, nylon or a combination thereof.

Figure 10:
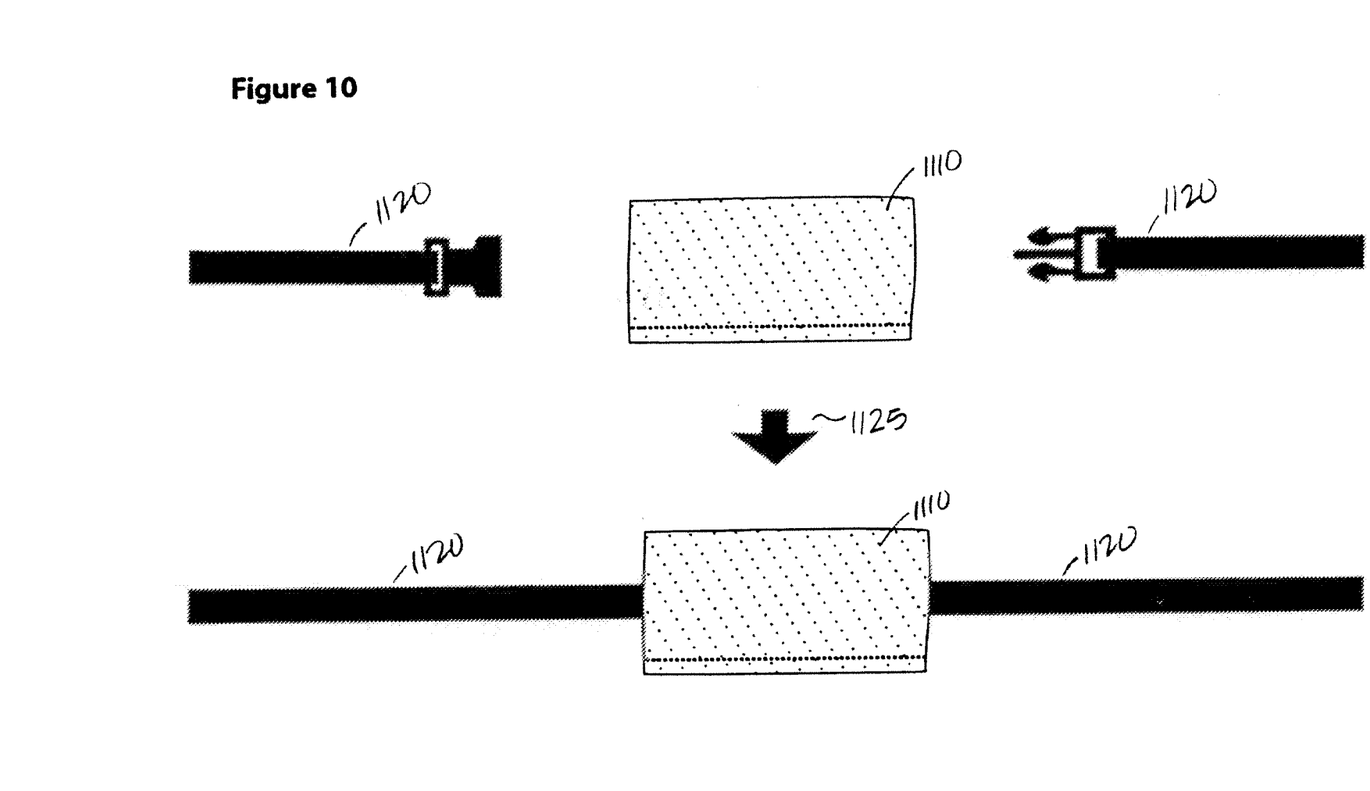
FIG. 10 shows a contemplated friction pad and a portion of any one of the straps.

FIG. 10 shows optional friction pads 1110 that can be coupled 1125 with the strap components 1120 and that have at least two primary functions: a) to make the windshield cover more secure at the corners and b) to protect the paint and finish on the vehicle.

Methods are also contemplated of using a recreational vehicle windshield cover, comprising: providing a windshield cover component having a bottom portion, a top portion, a left side and a right side, at least two strap components coupled to the bottom portion of the windshield cover component, and at least one strap component coupled to the top portion of the windshield cover component; providing a recreational or large vehicle; securing the top strap component to the top of the recreational or large vehicle; and securing the at least two strap components coupled to the bottom portion of the windshield cover component to the side of the recreational or large vehicle.

Thus, specific embodiments of adjustable and flexible recreational or large vehicle windshield covers have been disclosed. It should be apparent, however, to those skilled in the art that many more modifications besides those already described are possible without departing from the inventive concepts herein. The inventive subject matter, therefore, is not to be restricted except in the spirit of the disclosure herein. Moreover, in interpreting the specification and claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

I claim:

1. A recreational or large vehicle windshield cover, comprising:
    a windshield cover component having a bottom portion, a top portion, a left side and a right side,
    at least two strap components coupled to the bottom portion of the windshield cover component,
    at least one strap component coupled to the top portion of the windshield cover component; and
    a weighting component coupled with the at least one strap component coupled to the top portion of the windshield cover component.

2. The recreational or large vehicle windshield cover of claim 1, further comprising a loop component operatively coupled with the at least one strap component coupled to the top portion of the windshield cover component.

3. The recreational or large vehicle windshield cover of claim 1, further comprising at least one coupling component on the bottom portion of the windshield cover.

4. The recreational or large vehicle windshield cover of claim 3, wherein the at least one coupling component is designed to couple with a fixture on the front of the recreational vehicle.

5. The recreational or large vehicle windshield cover of claim 1, wherein the at least one strap component coupled to the top portion of the windshield cover component is designed to couple with a fixture on the roof of the recreational vehicle.

6. The recreational or large vehicle windshield cover of claim 1, further comprising at least one friction pad coupled with the at least one strap component coupled to the top portion of the windshield cover component, at least two strap components coupled to the bottom portion of the windshield cover component or a combination thereof.

7. The recreational or large vehicle of claim 1, wherein the vehicle comprises a Class "A" or "Bus" style vehicle.

8. A method of using a recreational or large vehicle windshield cover, comprising:
   providing a windshield cover component having a bottom portion, a top portion, a left side and a right side, at least two strap components coupled to the bottom portion of the windshield cover component, and at least one strap component coupled to the top portion of the windshield cover component;
   providing a recreational or large vehicle;
   providing a weighting component coupled with the at least one strap component coupled to the top portion of the windshield cover component;
   securing the top strap component to the top of the recreational or large vehicle; and
   securing the at least two strap components coupled to the bottom portion of the windshield cover component to the side of the recreational or large vehicle.

9. The method of claim 8, wherein the vehicle comprises a Class "A" or "Bus" style vehicle.

10. The method of claim 8, further comprising a loop component operatively coupled with the at least one strap component coupled to the top portion of the windshield cover component.

11. The method of claim 8, further comprising at least one coupling component on the bottom portion of the windshield cover.

12. The method of claim 11, wherein the at least one coupling component is designed to couple with a fixture on the front of the recreational vehicle.

13. The method of claim 8, wherein the at least one strap component coupled to the top portion of the windshield cover component is designed to couple with a fixture on the roof of the recreational vehicle.

14. A recreational or large vehicle windshield cover, comprising:
   a windshield cover component having a bottom portion, a top portion, a left side and a right side,
   at least two strap components coupled to the bottom portion of the windshield cover component,
   at least one strap component coupled to the top portion of the windshield cover component; and
   at least one friction pad coupled with the at least one strap component coupled to the top portion of the windshield cover component, at least two strap components coupled to the bottom portion of the windshield cover component or a combination thereof.

* * * * *